Nov. 24, 1959 J. R. ANDERSON 2,914,748
STORAGE MATRIX ACCESS CIRCUITS
Filed Dec. 10, 1956
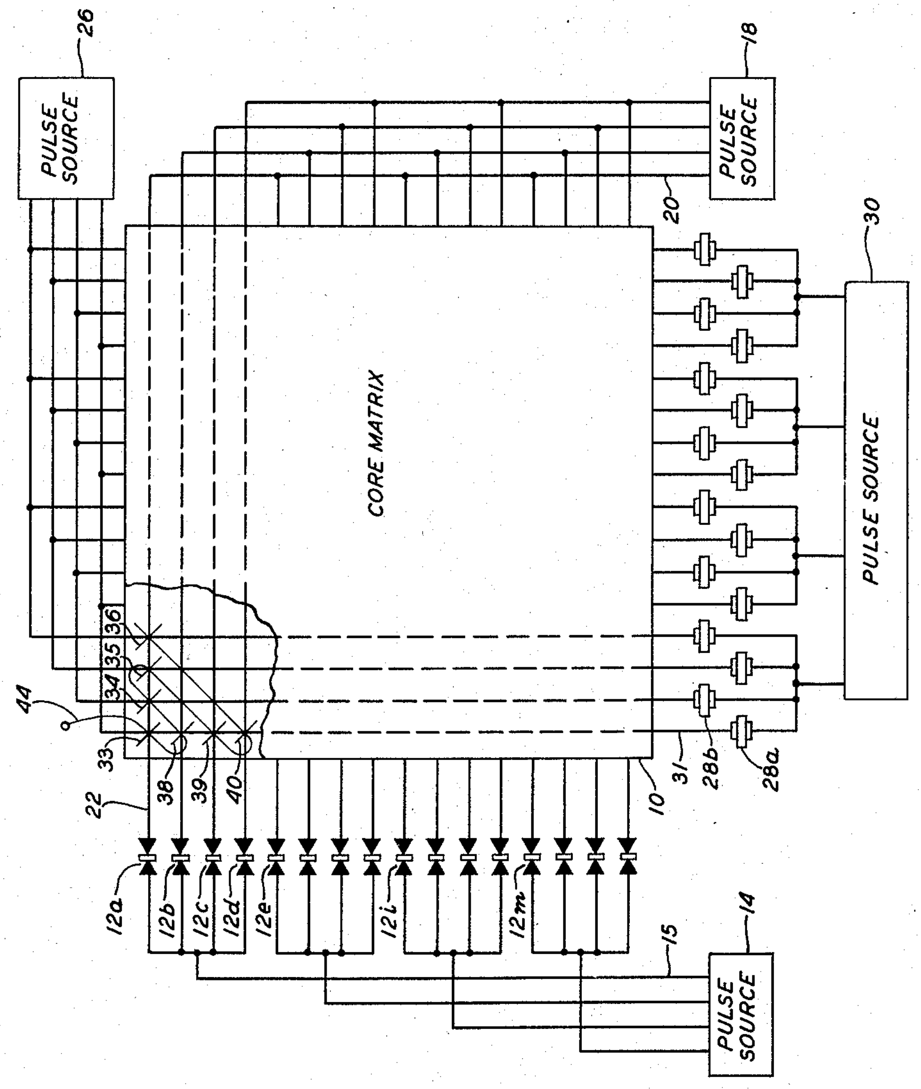
INVENTOR
J. R. ANDERSON
BY
James S. Falk
ATTORNEY United States Patent Office 2,914,748

Patented Nov. 24, 1959

2,914,748

STORAGE MATRIX ACCESS CIRCUITS

John R. Anderson, Dayton, Ohio, assignor to Bell Telephone Laboratories, Incorporated, New York, N.Y., a corporation of New York Application December 10, 1956, Serial No. 627,234

8 Claims. (Cl. 340—166)

This invention relates to electrical access circuits and, more particularly, to access circuits for storage matrices.

Magnetic cores exhibiting rectangular hysteresis loops may be employed as memory devices. One such form of memory device is the matrix which is formed by arranging these magnetic cores in rows and columns. Each core is linked by three windings. Two of the windings are connected in series by rows and columns and a third is a common series winding. All the cores are magnetized to one or the other of two remanent magnetic states on the hysteresis loop. In this state, the array is said to be holding information previously stored. In order to set any given core to the desired remanence, complementary pulses of current are simultaneously applied to the row and column of the core. The amplitude of these currents is so adjusted that their additive effects produce sufficient magnetomotive force to exceed the knee of the hysteresis loop for the selected core at the intersection of the row and column leads but insufficient to exceed the knee for the other cores in the selected lines or leads where they act singly. Consequently, the selected core will be magnetized in the desired direction while all other cores in the matrix will remain unaffected.

A more detailed explanation of magnetic core matrices and their operation is to be found in volume 41, No. 10 of the October, 1953 Proceedings of the I.R.E., pages 1407 through 1421.

In switching circuits used as access circuits for storage matrices, the volumetric displacement of the access switches may be many times the volume required for the storage cells. The cost per storage bit of the complete system is largely determined by the cost of the access circuits. In my application Serial No. 524,081, filed July 25, 1955, there are disclosed access switches comprising gating transistors having their collectors individually connected to rows of a ferroelectric storage matrix and having their bases coupled through individual magnetic cores to a gating pulse source. The emitters of these transistors are connected to two pulse sources, these two pulse sources being adapted to deliver either positive or negative pulses to a common bus connected to the emitters of all the transistor gates. At least three pulse sources are employed to apply a pulse to a row electrode of the matrix and a large number of leads are employed to couple the pulse sources to the access switches.

Accordingly, it is an object of this invention to provide a simple low cost access switch requiring a minimum amount of space.

It is a further object of this invention to provide an access switch for a matrix employing crystalline solid state devices.

It is a further object of this invention to provide an improved coincident voltage access switch for a ferromagnetic matrix.

Briefly, in accordance with the aspects of this invention, a plurality of bilateral crystalline coincident voltage responsive devices or switches are serially connected to the row leads of a ferromagnetic matrix. The switches in the row leads are connected together in groups in accordance with one predetermined arrangement on the side of the switches remote from the matrix and are connected together in groups in accordance with another predetermined arrangement at the row leads on the side of the matrix remote from the switches. Pulses applied to one group in each arrangement will be coincident at only one of the switches. The coincident pulses are complementary and are of sufficient magnitude to cause the switch to be rendered in its low impedance condition permitting a relatively large current to flow through the associated row lead. Similar switches may be connected in groups in a like manner to the column leads of the matrix if it is desired to store and read out relative to the matrix on a single core-at-a-time basis.

In accordance with other aspects of this invention, these coincident voltage switches are pairs of oppositely poled serially connected Zener diodes which are otherwise known as saturation or breakdown diodes. Complementary pulses are applied to groups of switches from each side of the switches, which pulses are coincident at only the selected diode switch. In response to these coincident complementary pulses, the selected switch is broken down or rendered conducting thereby permitting a relatively high current flow through the selected lead associated with the selected switch.

In accordance with still other aspects of this invention, the bilateral voltage responsive devices are ferroelectric capacitors serially connected between one pulse source and the matrix leads while another pulse source is connected to groups of these leads on the opposite side of the matrix. These connections are arranged in different groups on each side of the capacitors such that complementary pulses applied to one group on one side and another group on the other side are coincident at only one capacitor. In response to this coincidence of complementary pulses from both pulse sources to one ferroelectric capacitor, this ferroelectric capacitor is shifted from one remanent state of polarization to the other remanent state of polarization, causing a relatively large current to flow in the associated matrix lead. If, however, pulses are only applied to one side of a ferroelectric capacitor switch, these pulses are insufficient to shift the remanent polarization of the capacitor to its other state and thus a relatively small current flows through the associated matrix lead.

If one of the foregoing types of switches is employed in conjunction with the row leads of a ferromagnetic matrix, a similar type switch may be employed in connection with the column leads of the matrix to effect storage and readout relative to the matrix on a single bit basis. If, however, it is desired to employ "word ordered" or row-at-a-time storage and readout relative to the matrix, any convenient form of pulsing circuitry may be employed which could simultaneously apply complementary store pulses or readout pulses to all the column leads of the matrix. For example, each column lead could be connected to a pulsing circuit of the type disclosed in Q. W. Simkins application Serial No. 588,013, filed May 29, 1956 or of the type disclosed in Q. W. Simkins application Serial No. 587,567, filed May 28, 1956, now Patent 2,882,482 issued April 14, 1959, both assigned to the assignee of this invention.

Both the ferroelectric capacitor and the serially connected pair of saturation diodes are crystalline devices which act as bilateral coincident voltage switches. These devices present a high impedance to voltage pulses of magnitude insufficient to break down in the instance of the saturation diodes or to reverse the remanent polarization in the instance of the ferroelectric capacitor and, as a result, a relatively small current flows. If, however, pulses of magnitude sufficient to overcome the remanent polarization of the ferroelectric capacitor or sufficient to break down the reverse connected saturation diodes are applied, then each of these devices presents a relatively low impedance to the pulse source and a relatively large current flows through the device. A more detailed description of the impedance and switching characteristics of ferroelectric capacitors is disclosed in my application Serial No. 548,035, filed November 21, 1955.

Saturation diodes are described in The Bell System Technical Journal, volume 33, No. 4, July, 1954, pages 827 through 858. When considered individually, these diodes have a forward low resistance in a manner similar to the ordinary diodes while in the reverse direction the reverse current remains very low up to a value called the "saturation voltage." When the saturation voltage is reached, the electrons and/or holes which comprise the leakage current are given sufficient energy to create other electron-hole pairs which add to the original reverse current. This process is cumulative and leads to large increases in current for small further increases in voltage. When two of these saturation diodes are serially connected in polarity opposition, their voltage response curve and current characteristics resemble those of a ferroelectric capacitor undergoing switching. A more detailed explanation of the characteristics of pairs of Zener diodes connected in polarity opposition is to be found in my application Serial No. 564,024, filed February 7, 1956, now Patent 2,876,436 issued March 3, 1959.

It is a feature of this invention to employ single crystalline coincident voltage responsive switches serially connected with certain of the leads of a ferromagnetic matrix and to connect these switches in groups to pulsing circuitry to apply pulses to both sides of only one of the coincident voltage responsive switches in response to concurrent pulses applied to two of the groups.

It is another feature of this invention to employ single crystalline coincident voltage responsive switches serially connected with certain of the leads of a ferromagnetic matrix, to connect one side of each of the switches together in groups in accordance with one predetermined arrangement, to connect the other side of each of the switches together in accordance with another predetermined arrangement, and to apply a pulse to one group on one side of the switches concurrently with a pulse applied to another group on the other side of the switches, which pulses will be coincident at only one of the switches.

It is another feature of this invention to employ pairs of saturation diodes serially connected in polarity opposition as coincident voltage responsive switches for a ferromagnetic matrix and to connect these switches in groups and to apply pulses to groups on opposite sides of the switches, which pulses are coincident at only one of the switches.

It is another feature of this invention to employ ferroelectric capacitors serially connected in the leads of a ferromagnetic matrix as coincident voltage responsive switches and to apply pulses to groups of these switches on opposite sides of the switches, which pulses are coincident at only one of the capacitors.

A complete understanding of this invention and of these and various other features thereof may be gained from consideration of the following detailed description and the accompanying drawing which depicts a combined block and schematic diagram of one specific illustrative embodiment of this invention.

Referring now to the drawing, there is depicted magnetic core matrix 10 having row and column leads. Double anode saturation diode switches 12 are serially connected between each of the row leads and pulse source 14. Between switches 12 and pulse source 14, connectors are connected in groups such that a single pulse from source 14 over one of the pulse buses or connectors, such as bus 15, is applied to one side of all of the switches 12 connected in this group which includes **12*a*, 12*b*, 12*c*, and 12*d*. The row leads on the side of the matrix opposite from switches 12 are connected in groups to pulse source 18. Simultaneously with the abovementioned pulse, pulse source 18 applies a complementary pulse over one of its buses such as bus 20 to the opposite side of a group of switches, in this instance, switches 12*a*, 12*e*, 12*i*, and 12*m*. Since these complementary concurrent pulses will be coincident at only switch 12*a*, this switch will be rendered in its conducting or low impedance state and a relatively large current will flow in the associated row lead which in this instance is lead 22. The column leads are connected in groups in accordance with one predetermined arrangement at the top of the matrix and these groups are connected to source 26 of pulses. Ferroelectric capacitors 28 are serially connected to the column leads on the opposite side of the matrix from source 26 in a manner similar to the connections between source 18 and the matrix row leads. Capacitors 28 are connected in groups to source 30 in a manner similar to the connections between source 14 and switches 12. Here again the arrangements of the groups associated with sources 26 and 30 are such that concurrent pulses from these two pulse sources applied to one of the groups of switches associated with the respective pulse sources will be coincident at only one of the switches. Matrix 10 is represented as a rectangular matrix of magnetic cores. However, only a few of the magnetic cores are depicted for the sake of simplicity. For example, cores 33, 34, 35, and 36 are shown associated with row lead 22 while cores 33, 38, 39, and 40 are shown associated with column lead 31**. Similar access switches may be employed with other forms of matrices such as a three-dimentional matrix.

While the arrangement depicted in the drawing is illustrative of a combination for storage and readout relative to the matrix on a bit-at-a-time basis, other arrangements for pulsing the column leads may be employed to achieve word ordered or row-at-a-time storage and readout relative to the matrix. For example, pulsing circuits of the type shown in either Q. W. Simkins application Serial No. 588,013, filed May 29, 1956 or in Q. W. Simkins application Serial No. 587,567, filed May 28, 1956, now Patent 2,882,482 issued April 14, 1959, both assigned to the assignee of this invention, may be connected to each of the column leads and connected to a common source of control pulses such as source 30. Utilizing either of these last-mentioned types of pulsing circuits, pulses may be applied to a row lead and pulses may be simultaneously applied to a number of the column leads to store or read out a group of pulses relative to the selected row of cores, which row may be selected by the simultaneous application of pulses from sources 14 and 18 in a manner previously explained.

While the pulse technique for the complete storage and readout cycle has not been explained, it is understood that any convenient pulse technique may be employed; for example, one of such pulsing techniques is explained in detail in an article entitled, "A Myriabit Magnetic-Core Matrix Memory," beginning on page 1407 of the October, 1953 issue of the Proceedings of the I.R.E.

Sensing or output winding 44 is shown in part and couples suitable output circuitry to each of the magnetic cores for reading out on a single bit basis. However, it is understood that if word ordered or row-at-a-time storage and readout is to be employed individual sensing windings will be coupled to each row of magnetic cores.

It is to be understood that the above-described arrangements are illustrative of the application of the principles of the invention. Numerous other arrangements may be devised by those skilled in the art without departing from the spirit and scope of the invention.

What is claimed is:

1. An access circuit for a ferromagnetic matrix having row and column leads including a plurality of bilateral crystalline coincident voltage responsive switches serially connected to certain of said leads, each of said voltage responsive switches having a normal high impedance state and a low impedance state for the transmission of bilateral pulses therethrough on the application of predetermined coincident voltages to each side of said switches, said switches being connected together on one side in groups in accordance with one predetermined arrangement, said certain leads being connected together in groups in accordance with a different predetermined arrangement on the side of said matrix remote from said switches, means for applying pulses to the first-mentioned groups and for applying coincident complementary pulses to said last-mentioned groups, and means for applying pulses to certain other of said leads.

2. An access circuit in accordance with claim 1 wherein said switches include pairs of oppositely poled serially connected Zener diodes.

3. An access circuit in accordance with claim 1 wherein said switches include a plurality of ferroelectric capacitors.

4. An access circuit for a storage matrix having a coordinate array of storage elements and having coordinate input leads comprising a plurality of bilateral coincident voltage responsive switches, each of said switches being serially connected to an associated lead in one coordinate, each of said voltage responsive switches having a normal high impedance state and a low impedance state for the transmission of bilateral pulses therethrough on the application of predetermined coincident voltages to each side of said switches, means connecting said switches in a first plurality of groups in one arrangement, means connecting said coordinate leads connected to said switches in a second plurality of groups in accordance with another arrangement, each of said first and second groups having only a single voltage responsive switch and associated lead connected in common thereto, means for applying pulses selectively to individual of said first groups, and means distinct from said first pulse means for applying coincident pulses individually to selected ones of said second groups to cause the single voltage responsive switch commonly connected to said selected first and said selected second group to shift from its high impedance to its low impedance state.

5. An access circuit in accordance with claim 4 wherein said storage matrix coordinate leads are arranged in rows and columns and each of said switches is serially connected to an associated row coordinate lead.

6. An access circuit in accordance with claim 4 wherein said storage matrix coordinate leads are arranged in rows and columns and each of said switches is serially connected to an associated column coordinate lead.

7. An access circuit in accordance with claim 4 wherein said switches comprise pairs of oppositely poled serially connected Zener diodes.

8. An access circuit in accordance with claim 4 wherein said switches comprise ferroelectric capacitors.

References Cited in the file of this patent

UNITED STATES PATENTS

| | | |
|---|---|---|
| 2,655,625 | Burton | Oct. 13, 1953 |
| 2,717,373 | Anderson | Sept. 6, 1955 |
| 2,734,185 | Warren | Feb. 7, 1956 |
| 2,734,187 | Rajchman | Feb. 7, 1956 |
| 2,736,880 | Forrester | Feb. 28, 1956 |
| 2,781,504 | Canepa | Feb. 12, 1957 |